Figure 1:
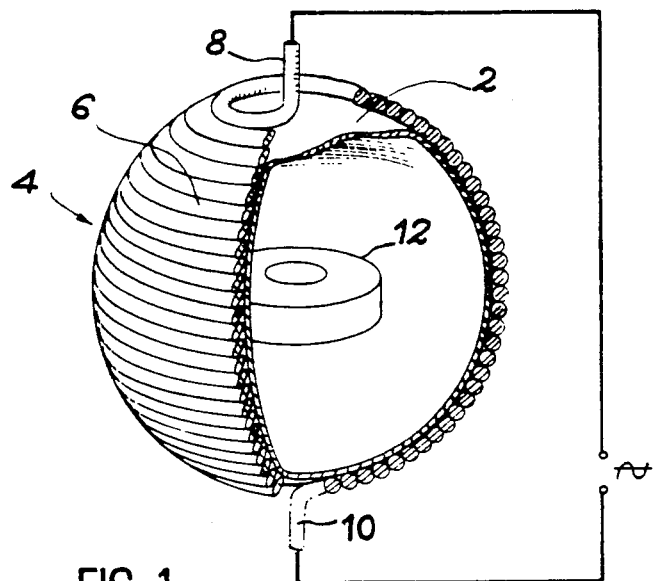

United States Patent [19]
Klein

[11] Patent Number: 4,862,430
[45] Date of Patent: * Aug. 29, 1989

[54] WIDE PASS BAND ELASTIC WAVE OMNIDIRECTIONAL TRANSDUCER

[75] Inventor: Siegfried Klein, 42, rue de la Tour d'Auvergne, 75009 Paris, France

[73] Assignees: Siegfried Klein; Commissariat a l'Energie Atomique, both of Paris, France

[*] Notice: The portion of the term of this patent subsequent to Nov. 1, 2005 has been disclaimed.

[21] Appl. No.: 228,302

[22] Filed: Aug. 4, 1988

[30] Foreign Application Priority Data

Aug. 14, 1987 [FR] France .................. 87 11598

[51] Int. Cl.⁴ .................................. H04R 15/00
[52] U.S. Cl. .................. 367/168; 367/172; 367/174
[58] Field of Search ............ 310/26, 337, 371; 367/156, 157, 164, 165, 168, 175, 172, 174

[56] References Cited

U.S. PATENT DOCUMENTS

| | | | |
|---|---|---|---|
| 1,635,045 | 12/1927 | Holinger | 367/157 |
| 2,233,244 | 2/1941 | Compare | 367/157 |
| 2,728,063 | 12/1955 | Renner | 367/168 |
| 4,642,802 | 2/1987 | Pozzo et al. | 367/168 |
| 4,782,471 | 11/1988 | Klein | 367/168 |

FOREIGN PATENT DOCUMENTS

| | | |
|---|---|---|
| 0063094 | 10/1982 | European Pat. Off. . |
| 0075911 | 4/1983 | European Pat. Off. . |
| 0177383 | 4/1986 | European Pat. Off. . |
| 526641 | 9/1940 | United Kingdom . |

OTHER PUBLICATIONS

Dr. B. K. Gazey of the University of Birmingham, "Underwater Electroacoustic Transducers", Jan. 17, 1969, pp. 117–120.

Primary Examiner—Brian S. Steinberger
Attorney, Agent, or Firm—Pearne, Gordon, McCoy & Granger

[57] ABSTRACT

Wide pass band elastic wave omnidirectional transducer.

It comprises a magnetostrictive material membrane (34, 36) provided with two electrical connections at two diametrically opposite points. The potential difference between these connections is proportional to the elastic wave transmitted or received by said membrane. A continuous polarization means of the magnetostrictive membrane is also provided. It comprises a high magnetic permeability part (40, 42), whose shape substantially corresponds to that of the membrane and which is placed in the vicinity of the latter, and a permanent magnet (38) in contact with said part.

Application to the transmission of high frequency elastic waves in water (hydrophone) and to high fidelity sound reproduction in air.

8 Claims, 5 Drawing Sheets

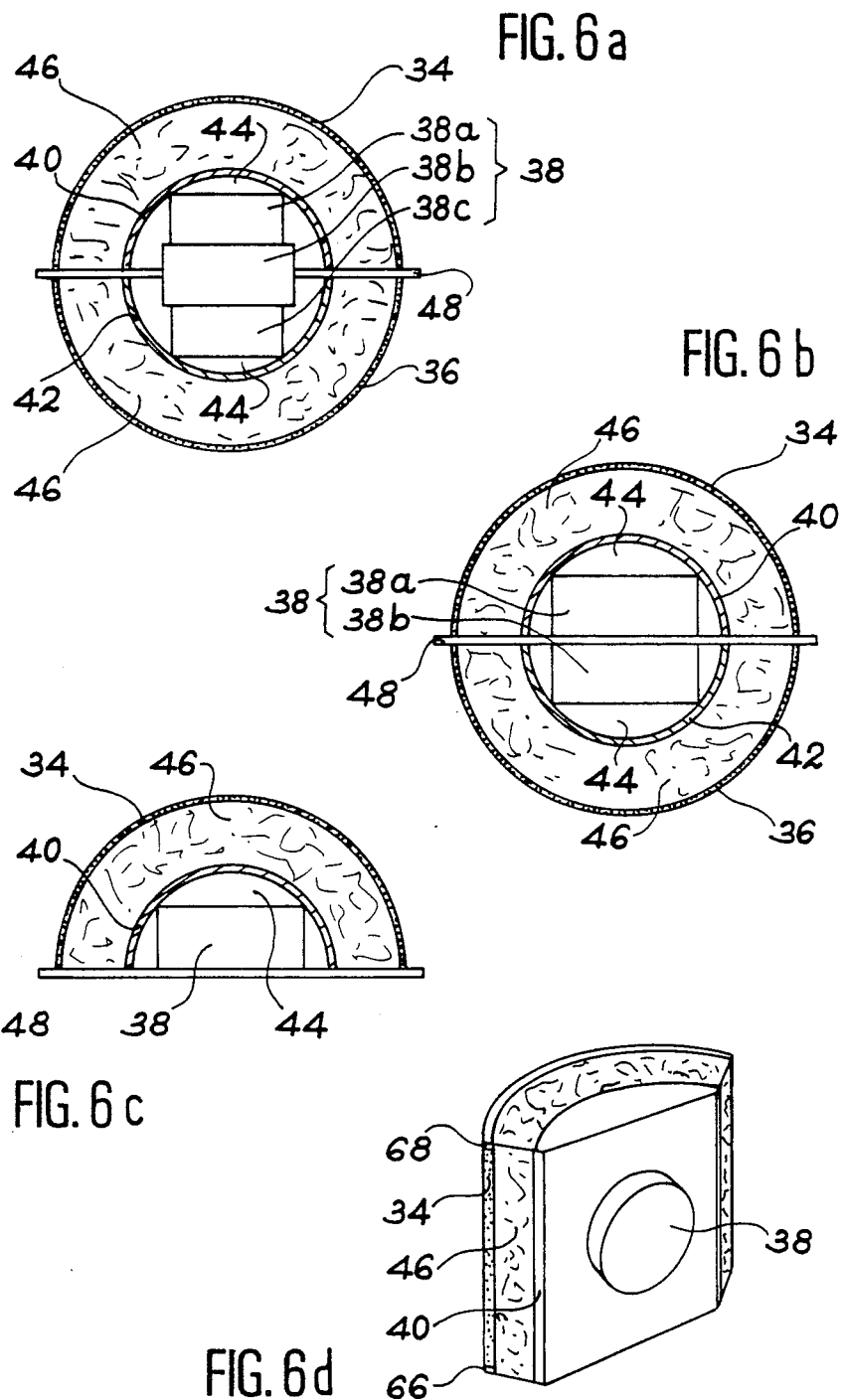

WIDE PASS BAND ELASTIC WAVE OMNIDIRECTIONAL TRANSDUCER

DESCRIPTION

The present invention relates to a wide pass band elastic wave omnidirectional transducer. The term elastic waves is understood to mean a pressure wave propagating in a liquid or gas. In the latter case, an elastic wave is often called an acoustic wave. The transducer can be used in transmission and then converts an electric signal into an elastic wave, or in reception and then converts an elastic wave into an electric signal. The transducer according to the invention is more particularly intended for the transmission of sound and ultrasonic waves.

The submarine transmission of elastic signals of high frequency (ultrasonic waves) constitutes a preferred application of the invention. The transducer can be used in this connection as a hydrophone, both as a receiver and as a transmitter. The wide pass band of said transducer permits the transmission of high frequency signals, such as e.g. television signals specially adapted for transmission in water (pass band approximately 200 kHz), speech signals or other information signals.

High fidelity sound reproduction constitutes another preferred application of the invention. The transducer used in transmission provides a high performance loudspeaker with a wide pass band.

The principle of the transducer according to the invention is based on the magnetostriction effect. Magnetostriction is the property of certain bodies of undergoing a geometrical modification (contraction, expansion, bending, twisting, etc.) when exposed to the influence of a magnetic field. Metal alloys and in particular ferromagnetic compounds are magnetostrictive materials.

Omnidirectional transducers of this type have been described by the Applicants in documents FR-A-2 569 930, FR-A-2 573 269 and FR-A-2 573 270. They essentially comprise a rigid magnetostrictive material diaphragm or membrane and an associated electrical control means. Each surface element of said membrane constitutes a unidirectional transducer of an elastic wave in its normal direction.

The membrane can have a random shape, which defines transmission directions of an elastic wave as directions normal to each surface element of the membrane. A membrane in the form of a closed surface (sphere, ellipsoid, cylinder closed by two hemispheres, etc.) consequently gives the transducer an omnidirectional character. The transducer membrane can also be in the form of a non-closed surface. For example, in the case of a hemispherical shape, the transducer is omnidirectional in a half-plane in space.

The electric control means associated with the membrane is provided with two electric terminals and positioned in the vicinity of at least part of the membrane. In the vicinity of the latter, it makes it possible to produce a substantially uniform magnetic field in response to an electric signal applied between its terminals. This magnetic field induces a geometrical modification (expansion or contraction) of each surface element of the membrane, which produces an elastic wave. Conversely, when an elastic wave reaches the membrane, the geometrical modification thereof under the action of said elastic wave (pressure, vacuum) modifies the value of the transducer polarization magnetic field. The control means is designed for detecting variations of said polarization magnetic field and therefore to supply an electric signal corresponding to the variation of said field.

FIG. 1 ilustrates an embodiment of an omnidirectional transducer in accordance with the documents referred to hereinbefore. In this drawing, the magnetostrictive membrane 2 is shaped like a sphere and the control means 4 is constituted by an electric conductor 6, which is insulated and coiled around said membrane. The ends 8, 10 of electric conductor 6 form the terminals of the electric control means permitting, in transmission, the application of an alternating voltage signal, which is transformed by the spherical membrane into an elastic wave and, in reception, to supply a voltage signal corresponding to an elastic wave received on the spherical membrane.

The transducer also comprises a continuous polarization means of the membrane, which can be constituted by a magnet 12, as shown in FIG. 1, or which can be a direct current source connected to ends 8 and 10. For spherical transducers with having a diameter exceeding approximately 15 cm., only the use of a current source can be envisaged, due to the excessive weight of the magnets. Continuous polarization is necessary when the transducer is used in reception, i.e. when it converts an elastic wave into an electric signal and is desirable, although not obligatory, when the transducer is used in transmission.

In the embodiment of FIG. 1, the spherical membrane is constituted by a single element. This is adapted to a transducer having a diameter of a few centimeters, but not to a transducer with a diameter of several dozen centimeters. For producing a transducer with a diameter exceeding a few centimeters, the spherical membrane is advantageously in the form of two hemispherical elements, which are then joined.

Figure 2:
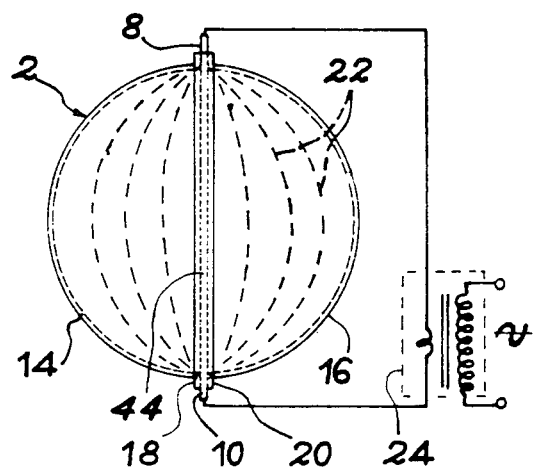

Such an embodiment, in accordance with the aforementioned documents, is shown in FIG. 2. The spherical membrane 2 is constituted by two hemispheres 14, 16, each having at their base a collar 18, 20. The latter make it possible to facilitate the connection of the two hemispheres, which can be carried out by welding with tin or under argon, the welding bead bearing on each collar.

The electric terminals 8, 10 of the control means are e.g. realized at two diametrically opposite points of the sphere located on the welding bead. This makes it possible to have a substantially homogeneous pulsating sphere because all the meridians 22 connecting the terminals 8, 10, which constitute the poles of the sphere, are identical, with the exception of the meridians corresponding to the welding bead 44. Thus, the current density along a meridian decreases with the distance to the electric terminals, because the current is constant and the surface on which it is distributed increases. However, this current density difference, i.e. vibration intensity, is compensated by the welding of the terminals, which provides a certain rigidity to the membrane in the vicinity of the terminals.

In the transducer according to FIG. 2, the electrical resistance between the electric terminals 8, 10 is low (a few dozen ohms), which makes it necessary to use an impedance matching means, said function being assured by transformer 24.

The transducer shown in FIG. 2 also comprises a continuous polarization means which can be constituted by a permanent magnet, as shown in FIG. 1, if the transducer has a diameter less than approximately 15 cm. The permanent magnet is placed in the centre of the sphere. It is maintained in position e.g. by being embedded in a material filling the internal volume of the sphere.

It has been found that the permanent magnet does not produce a perfectly uniform magnetic field in the magnetostrictive membrane. This limits the performance characteristics of the transducer, the surface elements of the membrane not reacting exactly with the same amplitude to the same elastic wave or the same electric signal.

The invention aims at improving the transducers described in the aforementioned documents, so that the magnetostrictive membrane is located in a continuous magnetic field which is as uniform as possible. This improvement consists of adding to the said transducer a high magnetic permeability part having the same shape as the magnetostrictive membrane and used for transmitting the magnetic field produced by the permanent magnet.

The invention more specifically relates to a wide pass band elastic wave omnidirectional transducer comprising a rigid magnetostrictive membrane having a front face and a rear face, each surface element of the membrane constituting, at least on the front face side, a unidirectional transducer of elastic waves in its normal direction, an electric control means provided with two electric terminals for producing in the vicinity of the membrane a uniform magnetic field related to the electric signal applied to the terminals of the control means or for supplying an electric signal related to the variation of the magnetic field in the membrane as a function of the elastic wave received and a continuous polarization means of the membrane, the transducer being characterized in that the continuous polarization means incorporates a high magnetic permeability part, which has a substantially identical shape to that of the membrane and has an outer face and an inner face, said outer face being in the vicinity of the rear face of the membrane and a permanent magnet in contact with said part.

According to a first preferred embodiment, the magnetostrictive membrane is hemispherical, the high magnetic permeability part having a hemispherical shape and being fitted into the said hemispherical membrane, whilst said permanent magnet comprises at least one flat ring, said rings having a diameter slightly smaller than the internal diameter of said part and being placed in said part.

According to a second preferred embodiment, the membrane is constituted by two hemispherical elements joined to form a sphere, said part being constituted by two hemispherical portions each located in a hemispherical element forming the membrane, said permanent magnet comprising at least one flat ring in the interior of said part.

In each of these two embodiments, the permanent magnet can comprise a plurality of stacked flat rings, optionally having different diameters.

According to a secondary feature, the transducer according to the second preferred embodiment comprises an amagnetic plate, said plate being shaped like a flat ring with a diameter slightly exceeding the diameter of the hemispherical elements and having a first face and a second face, each portion of the said part being placed on one face of said plate.

The invention is described in greater detail hereinafter relative to non-limitative embodiments and the attached drawings, wherein show:

FIGS. 1 and 2, already described, known elastic wave omnidirectional transducers.

Figure 3:
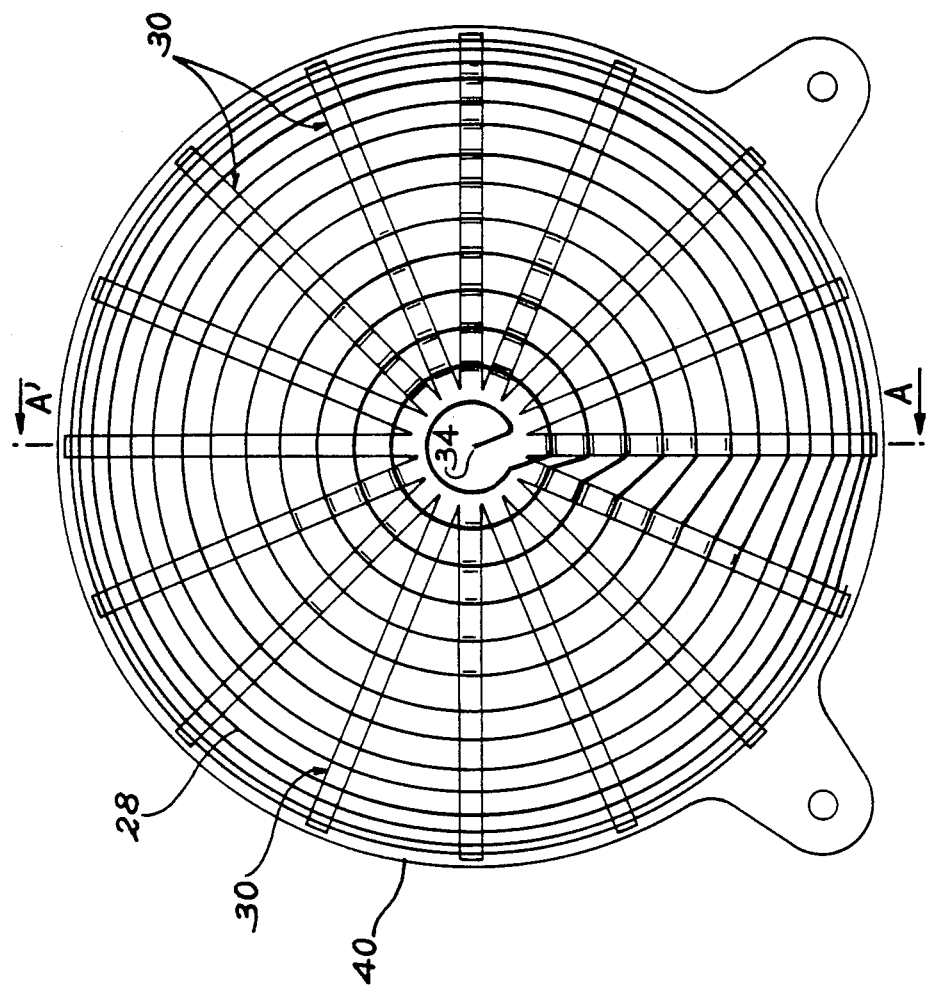
Figure 4:
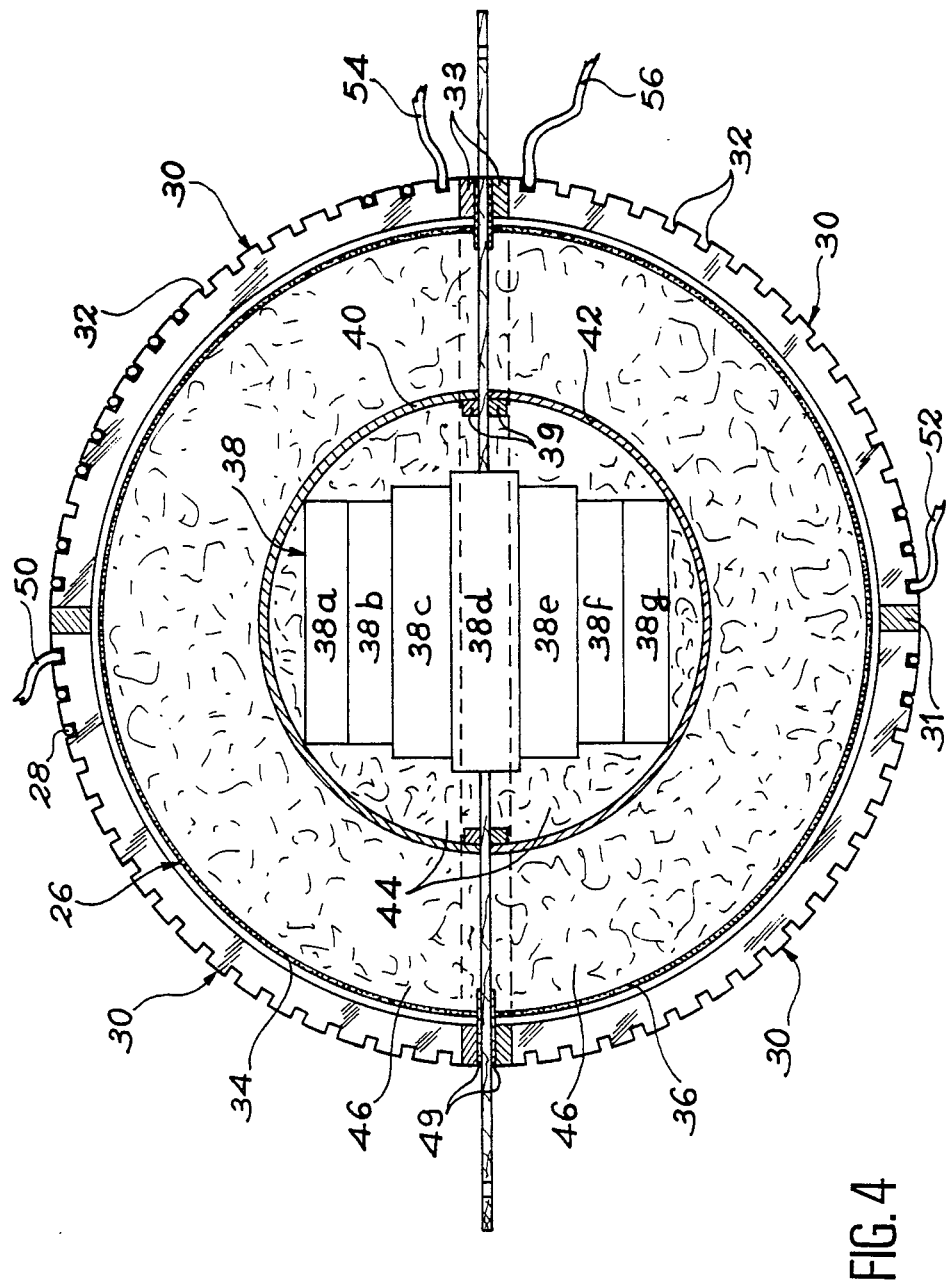

FIGS. 3 and 4, an embodiment of an omnidirectional transducer according to the invention, respectively in plan view and in section along axis AA'.

Figure 5:
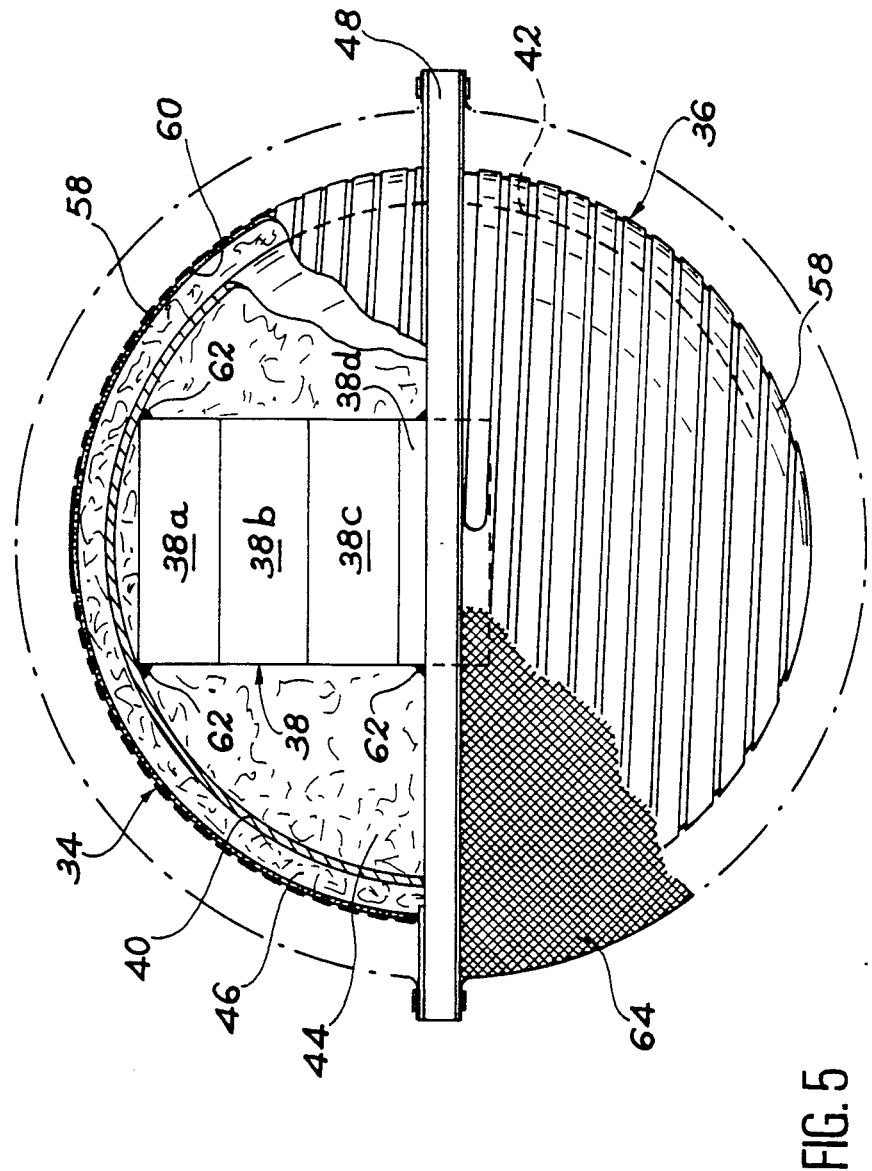

FIG. 5, another embodiment of the transducer according to the invention.

FIGS. 6a to 6d, diagrammatically other constructional variants of the transducer according to the invention.

A first embodiment of the transducer according to the invention is shown in FIGS. 3 and 4. As in the known transducer shown in FIG. 2, the transducer shown in FIGS. 3 and 4 comprises a spherical magnetostrictive membrane 22 around which is wound a conductor wire 28.

In the embodiment shown in FIG. 1, the conductor wire is directly wound on to the magnetostrictive membrane. This construction mode is well adapted to transducers with a diameter of a few centimeters.

The embodiment shown in FIGS. 3 and 4 is different and more advantageous for transducers having a larger diameter. Thus, in this case, it is preferable, particularly for overal dimensional reasons, to produce two hemispherical magnetostrictive elements 34, 36 which are then joined, rather than directly producing a magnetostrictive sphere.

A coil is produced independently on each hemispherical element 34, 36. For this purpose, use is made of a plurality of coiling supports 30, each of which forms a quarter circle disposed in accordance with a meridian of the hemispherical element. These coiling supports are fixed by bonding or the like on the one hand to an element 31 located at the apex of the hemispherical element and on the other hand to the ring 33 located at the base of the hemispherical element. Each coiling support has a plurality of slots 32 for receiving the conductor wire 28. For each hemispherical element 34,36, the wire is wound from the hemisphere apex towards its base.

Prior to fixing together the two hemispherical elements, the continuous polarization means is introduced. According to the invention, this continuous polarization means comprises a permanent magnet and a part having a high magnetic permeability material, said part being in contact with the magnet and making it possible to render uniform the magnetic field within the sphere.

The permanent magnet 3 e.g. comprises a plurality of stacked rings 38a-38g. The high magnetic permeability part is e.g. constituted by two hemispherical portions 40, 42, each of which is placed in a magnetostrictive hemispherical element.

When the two hemispherical portions are joined for forming a sphere, the magnetic field is zero in the connecting plane of these two hemispherical portions. To obviate this deficiency, it is possible to add to the base of each hemispherical portion 40, 42 a washer 39, 41 for equalizing the magnetic field.

The hemispherical portions 40, 42 can be made from 2 mm. thick soft iron. The thickness must be adequate to ensure a good distribution of the magnetic field and for avoiding the hemispherical portions resonating at the same time as the magnetostrictive membrane.

In order to reduce residual resonances, the internal volume of the spherical part 40, 42 can be filled with an elastic wave-absorbing material 44, such as compressed glass wool, which also maintains the permanent magnet 38 in position.

In the same way, the space between the hemispherical portions 40, 42 and the magnetostrictive hemispherical elements 34, 36 can be filled with an elastic wave-absorbing material 46. It is preferable to use here preshaped glass wool, so that each hemispherical portion 40, 42 is correctly positioned with respect to the corresponding magnetostrictive hemispherical element 34, 36.

The distance between the magnetostrictive hemispherical element and the hemispherical portion of the part is not important and can range between a few millimeters and a few centimeters.

The two halves of the transducer are joined via a plate 48 on which each of them is fixed. This plate is made from an amagnetic material (wood, brass, etc.) and has a recess in which is placed one of the rings 38d of the permanent magnet 38. A rubber joint 49 is provided between plate 48 and the magnetostrictive hemispherical elements.

The coiled wires on each magnetostrictive hemispherical element 34, 36 have in each case an end 50, 52 in the vicinity of the apex of the hemisphere and an end 54, 56 at the base of the hemisphere. Ends 54 and 56 are connected for producing a complete coil of the sphere, as in the case of the transducer shown in FIG. 1. Ends 50 and 52 constitute the terminals of the control means.

FIG. 5 shows a second embodiment of the transducer according to the invention and the elements identical to those of FIGS. 3 and 4 carry the same references.

Each magnetostrictive hemispherical element 34, 36 is constituted by a magnetostrictive tape 58, fixed e.g. by bonding in spiral manner to a support 60. The latter is hemispherical and is advantageously made from an elastic wave-absorbing material, e.g. nitrile rubber D55. This support has a thickness of a few tenths of a millimeter.

Each magnetostrictive tape 58 has two ends, whereof one is located at the apex of the hemisphere and the other at the base of the hemisphere. The two ends located at the base of each hemisphere are interconnected to obtain a complete spherical magnetostrictive coil. The two ends at the apex of each hemisphere constitute the terminals of the control means.

In the transducer of FIG. 5, the electric signal is consequently applied directly to the magnetostrictive material, as in the transducer of FIG. 2.

Each of the two hemispheres is fixed to a plate 48 for forming a spherical transducer. In known manner, said transducer contains a continuous polarization means of the magnetostrictive membrane 34, 36. This continuous polarization means is e.g. constituted by stacked magnetized rings 38a, 38b, etc.

According to the invention, the transducer also contains a high magnetic permeability part in contact with the continuous polarization means and whose function is to render uniform the magnetic field in the vicinity of the magnetostrictive membrane. This part is constituted by two hemispherical portions 40, 42 respectively corresponding to the magnetostrictive hemispherical elements 34, 36.

This part contains magnetized rings 38a, 38b, etc. which can be maintained in position by fixing joints 62. The internal volume of the part is filled with an elastic wave-absorbing material 44, e.g. compressed glass wool, which also contributes to maintaining the magnetized rings 38a, 38b, etc. in position. The volume between each hemispherical portion 40, 42 of the high magnetic permeability part and the magnetostrictive hemispherical element 34, 36 or more precisely the support 60 is also filled with an elastic wave-absorbing material 46, e.g. preshaped glass wool, which ensures a correct relative positioning of hemispherical portions 40, 42 and support 60.

The transducer of FIG. 5 is completed by a protective grid 64 formed from two hemispheres fixed to plate 48 and covering the magnetostrictive hemispherical elements 34, 36.

FIGS. 3 to 5 illustrate two embodiments of an elastic wave omnidirectional transducer according to the invention. These transducers are in accordance with the diagrammatic section of FIG. 6a. The magnetostrictive membrane is constituted by two hemispherical elements 34, 36. The high magnetic permeability part is also constituted by two hemispherical portions 40, 42. A magnet 38 constituted by several stacked rings 38a, 38b, 38c is placed inside the part and in contact therewith. Magnet 38 traverses the connecting plate 48 of the two hemispheres.

FIG. 6b shows in section a slightly different transducer. The plate 48 is not recessed, magnetized rings 38a, 38b being placed on each of its faces.

The transducers shown in FIGS. 1, 5, 6a and 6b have a spherical magnetostrictive membrane. Such a perfectly omnidirectional transducer is particularly suitable for the high fidelity reproduction of sound.

However, the invention is not limited to this embodiment and still applies no matter what the shape of the magnetostrictive membrane.

This membrane can e.g. be hemispherical, as shown in FIG. 6c, or in the form of a cylindrical portion, as shown in FIG. 6d. In these drawings, the elements identical to those of FIGS. 6a and 6b carry the same references. The transducer shown in section in FIG. 6c corresonds to a hemisphere of the transducer shown in FIG. 6b.

The transducer shown in perspective view in FIG. 6d comprises a magnetostrictive membrane 34 in the form of a cylinder portion, an elastic wave-absorbing material 46 fixed to the inner face of the magnetostrictive membrane, a high magnetic permeability part 40 and a permanent magnet 38.

One face of part 40 has the same shape as the inner face of the magnetostrictive membrane, said face being fixed to material 46. The other face of part 40 is planar, the permanent magnet 38 being fixed to said other face. The terminals of the control means of said transducer are constituted by circular arc-shaped electrical conductors 66, 68 and connected to two opposite edges of the magnetostrictive membrane.

Special embodiments of the transducer according to the invention have been described with reference to the drawings. It is obvious that the invention is not limited to these embodiments and in fact applies to all transducers having a magnetostrictive membrane, no matter what its shape and in particular to the transducers described in FR-A-2 569 930 FR-A-2 573 269 and FR-A-2 573 270.

I claim:

1. An elastic wave omnidirectional transducer comprising: a rigid magnetostrictive membrane constituted by two hemispherical elements joined to form a spherical shell having an outer face and an inner face, each hemispherical element of the membrane constituting, at least on the outer face, a unidirectional transducer of elastic waves in a direction normal to the membrane; an electric control means provided with two electric terminals located on each hemispherical element at diametrically opposite points of the shell for producing in the membrane a uniform magnetic field in response to an electric signal applied to the terminals of the control means; and a continuous polarization means incorporating a part having a magnetic permeability adapted to distribute a magnetic field and a substantially identical spherical shape to that of the membrane, said part being fitted inside the shell and being in magnetic communication with said shell, and a permanent magnet in contact with said part.

2. Transducer according to claim 1, wherein said magnet has at least one flat ring, being disposed within said part.

3. Transducer according to claim 1, wherein said part comprises two hemispherical portions, each located in the corresponding hemispherical element constituting said membrane, said magnet comprising at least one flat ring located in the interior of said part.

4. Transducer according to claim 3, comprising a non-magnetic plate shaped like a flat ring having a slightly larger diameter than that of the hemispherical elements and having a first face and a second face, each portion of said part being placed on one face of said plate.

5. Transducer according to claim 4, wherein said magnet comprises two ring-like elements, each element of said magnet being disposed on one face of said plate.

6. Transducer according to claim 4, wherein the plate has a recess, said magnet being placed in said recess and is in contact with said plate.

7. Transducer according to claim 1, wherein any empty internal volume of said part is filled with an elastic wave-absorbing material.

8. Transducer according to claim 1, further comprising an elastic wave-absorbing material between the inner face of the magnetostrictive membrane and the part.

* * * * *